(12) United States Patent
Bang

(10) Patent No.: US 7,703,935 B2  
(45) Date of Patent: Apr. 27, 2010

(54) ARRANGEMENT STRUCTURE OF BACKLIGHT IN DIRECT TYPE LIQUID CRYSTAL DISPLAY DEVICE

(75) Inventor: Ju-Young Bang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 377 days.

(21) Appl. No.: 11/117,378

(22) Filed: Apr. 29, 2005

(65) Prior Publication Data

US 2006/0002144 A1    Jan. 5, 2006

(30) Foreign Application Priority Data

Jun. 30, 2004    (KR) .................. 10-2004-0050709

(51) Int. Cl.  
*G09F 13/04*    (2006.01)

(52) U.S. Cl. ............... 362/97.1; 362/97.2; 362/217.08; 362/217.14; 362/225; 362/263; 313/234; 313/243; 313/244; 313/246; 313/493

(58) Field of Classification Search .......... 362/267, 362/613, 97, 260, 27, 634, 252, 224, 225, 362/29, 30, 97.1, 97.2, 217.08, 217.14; 313/243, 313/244, 246, 493, 581, 582, 607, 594  
See application file for complete search history.

(56) References Cited

U.S. PATENT DOCUMENTS 5,703,326 A * 12/1997 Yamada et al. ........... 174/50.52

| 6,939,020 | B2 * | 9/2005 | Lim ................... 362/97 |
| 7,044,629 | B2 * | 5/2006 | Moon ................ 362/634 |
| 7,055,985 | B2 * | 6/2006 | Chou et al. ........... 362/225 |
| 2003/0035283 | A1 * | 2/2003 | Lim ................... 362/97 |
| 2004/0037073 | A1 * | 2/2004 | Yang et al. ........... 362/218 |
| 2004/0119418 | A1 | 6/2004 | Moon |
| 2005/0013134 | A1 * | 1/2005 | Yoo et al. ............ 362/235 |
| 2006/0072322 | A1 * | 4/2006 | Lee et al. ............ 362/260 |

FOREIGN PATENT DOCUMENTS

CN    1379274    11/2002

* cited by examiner

*Primary Examiner*—Sandra L O'Shea  
*Assistant Examiner*—Mary Zettl  
(74) *Attorney, Agent, or Firm*—McKenna Long & Aldridge LLP

(57) ABSTRACT

A backlight unit in a direct type liquid crystal display device includes a plurality of lamps, wherein each lamp includes a first end, a second end opposing the first end, and a fluorescent part between the first and second ends, and a supporter supporting the plurality of lamps, wherein fluorescent parts of adjacent lamps are longitudinally offset from each other, and each lamp includes a first external electrode at the first end of the lamp, and a second external electrode at the second end of the lamp.

29 Claims, 4 Drawing Sheets

ARRANGEMENT STRUCTURE OF BACKLIGHT IN DIRECT TYPE LIQUID CRYSTAL DISPLAY DEVICE

This application claims the benefit of Korean Patent Application No. 2004-050709, filed on Jun. 30, 2004, which is hereby incorporated by reference for all purposes as if fully set forth herein.

BACKGROUND OF THE INVENTION

1. Field of the Invention

The principles of the present invention generally relate structures of backlight units in a direct type liquid crystal display device.

2. Discussion of the Related Art

As the capabilities of information processing apparatuses and display technologies continue to advance, various types of display devices are actively developed. Due to their low power consumption and compact, lightweight construction, liquid crystal display (LCD) devices have been the subject of extensive research and have been implemented in many applications.

Generally, LCD devices include LCD panels that include a thin film transistor (TFT) array substrate, a color filter substrate spaced apart from the TFT substrate, and liquid crystal material provided within a gap formed between the TFT array and color filter substrates. The TFT array substrate generally supports a plurality of gate lines and a plurality of data lines crossing the plurality of gate lines, wherein unit pixels are defined at the crossings of the gate and data lines, and switching devices (i.e., TFTs) connected to the gate and data lines at the crossings thereof. The color filter substrate generally supports color filter layers (e.g., red, green and blue layers) to express images having natural colors.

By themselves, LCD panels do not generate light that is necessary to express images. Therefore, to express images, light must be generated by a light source that is external to the LCD panel. In many cases, such a light source is provided within a backlight unit. Depending on the location of the light source with respect to the LCD panel, backlight units can be generally classified as either direct-type or edge-type.

Edge-type backlight units generally include a lamp unit provided along a lateral side of a light-guide plate that is disposed beneath an LCD panel and are typically incorporated within relatively small-sized LCD devices (e.g., monitors for laptop, desktop computers, etc.). Direct-type backlight units generally include a plurality of lamps provided beneath a lower surface of a light-diffusion sheet that is, in turn, disposed beneath an LCD panel and are typically incorporated within large-sized LCD devices (e.g., large monitors, televisions, etc.).

FIG. 1 illustrates a cross-sectional view of a related art direct-type backlight unit.

Referring to FIG. 1, disposed at a backside of an LCD panel 120 a related art direct-type backlight unit generally includes a plurality of lamps 110 (i.e., bar-type, cold cathode fluorescent lamps (CCFLs)) arranged in parallel with one another and disposed within a cavity formed in a bottom cover 101 (i.e., a mold frame) for protecting the plurality of lamps 110. A reflective plate is disposed between the bottom cover 101 and the plurality of the lamps 110 to reflect light generated by the lamps 110 toward the LCD panel 120. The related art direct-type backlight unit further includes a diffusion plate 107 for uniformly diffusing the light generated by the lamps 110 and transmitting the diffused light toward the LCD panel 120, and a diffusion sheet 109 disposed on the diffusion plate 107. The diffusion plate 107 and diffusion sheet 109 are supported by edges of the bottom cover 101.

FIG. 2 illustrates a perspective view of the related art direct-type backlight unit shown in FIG. 1.

Referring to FIG. 2, the plurality of lamps 110 are supported within the bottom cover 101 by lamp fixing members 111. Moreover, lamp electrodes (not shown) formed on opposing ends of the plurality of lamps 110, are supported by a lamp support 112 provided at opposing sides of the bottom cover 101. Each lamp electrode is connected to power supply lines (not shown) for supplying power to corresponding ones of the plurality of lamps 110. Although not shown, power supply lines that supply power to a particular lamp are connected to each other to form a closed circuit around the particular lamp 110. Each closed circuit is provided with an inverter to convert externally applied direct current (DC) voltage into an alternating current (AC) voltage that is supplied the particular lamp 110. Although not shown, each inverter is connected to a ground printed circuit board (PCB) arranged at a rear. surface of the bottom cover 101.

As noted, the plurality of lamps 110 discussed above with respect to FIGS. 1 and 2 are provided as CCFLs. Each CCFL can be conceptually divided into a fluorescent part and external electrode parts for applying a tube voltage to the fluorescent part, wherein the fluorescent part generates light in response to the applied tube voltage. The fluorescent part generally includes a fluorescent material coated onto the interior of a lamp tube. External electrodes within the external electrode parts are typically formed by coating an opaque metal film onto opposing ends of the lamp tube. Generally, the brightness of a lamp 110 increases when the applied tube voltage increases. However, when the applied tube voltage is over 2000 Vrms, an undesirably excessive amount of ozone can be generated within the fluorescent part due to ionization of discharge gas within the lamp 110. Excessive amounts of ozone deleteriously reduce the brightness of the lamp 110. Therefore, the external electrodes of the lamp 110 can be lengthened to reduce the applied tube voltage.

FIG. 3 illustrates a plan view of a related art direct-type backlight unit incorporating lamps with lengthened external electrodes. FIG. 4 illustrates a side view of the related art backlight unit shown in FIG. 3.

Referring to FIGS. 3 and 4, a plurality of lamps 110, each conceptually divided into external electrode parts 103a and 103b and a fluorescent part 105, are supported by a plurality of lamp supports 112. When the lamps 110 are installed within the lamp supports 112, the lengthened external electrode parts 103a beneficially reduce the applied tube voltage but undesirably extend into a luminous area of the backlight unit between the lamp supports 112. However, because the external electrode parts 103a and 103b are typically formed by coating an opaque metal film onto the lamp tube, the lengthened external electrode parts 103a and 103b uniformly extend into the luminous area of the backlight unit and undesirably cast shadows onto portions of the diffusion plate 107 and diffusion sheet 109 that are aligned with display regions of an overlying LCD panel. The cast shadows, therefore, decrease the uniformity of light transmitted to the LCD panel as well as decrease the average brightness of images expressed by the LCD panel.

SUMMARY OF THE INVENTION

Accordingly, the principles of the present invention are directed to a direct-type backlight unit that substantially obviates one or more of the problems due to limitations and disadvantages of the related art.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit may, for example, include a plurality of lamps, wherein each lamp includes a first end, second end opposing the first end, and a fluorescent part between the first and second ends; and a supporter supporting the plurality of lamps, wherein fluorescent parts of adjacent lamps are longitudinally offset from each other.

In another aspect, a liquid crystal display (LCD) may, for example, include an LCD panel; and a backlight unit beneath the LCD panel, wherein the backlight unit may include a plurality of lamps, wherein each lamp includes a first end, second end opposing the first end, and a fluorescent part between the first and second ends; and a supporter supporting the plurality of lamps, wherein fluorescent parts of adjacent lamps are longitudinally offset from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 5:
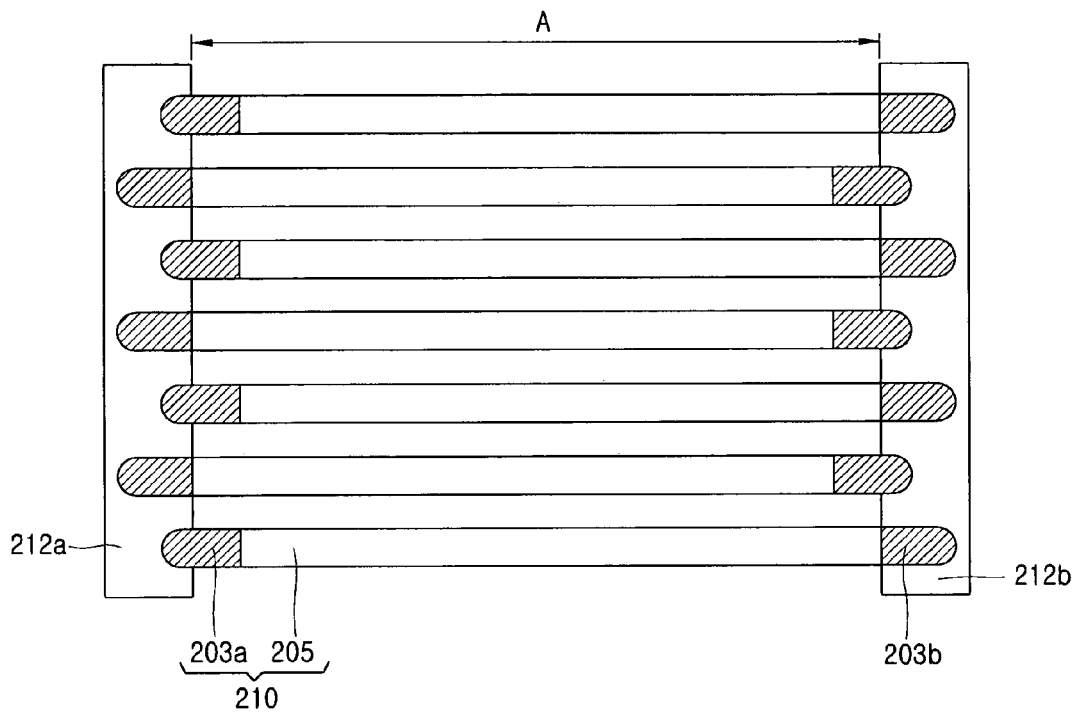
FIG. 5 illustrates a plan view of a direct-type backlight unit in accordance with the principles of a first embodiment of the present invention.

FIG. 5 illustrates a plan view of a direct-type backlight unit in accordance with the principles of a first embodiment of the present invention.

Referring to FIG. 5, a direct-type backlight unit according to principles of a first embodiment of the present invention may, for example, include a plurality of lamps 210, wherein each lamp 210 includes a first end and a second end. In one aspect of the present invention, the plurality of lamps 210 may be substantially the same length. In another aspect of the present invention, each lamp 210 may, for example, include a tube formed of a material such as glass, or the like, and first and second external electrodes 203a and 203b, respectively, formed at respective first and second ends of the lamp 210, wherein a fluorescent part 205 is disposed between the first and second external electrodes 203a and 203b. In yet another aspect of the present invention, each of the plurality of lamps 210 may be arranged parallel to an adjacent lamp 210.

According to principles of the present invention, the plurality of lamps 210 may be supported within the backlight unit by a supporter. In one aspect of the present invention, the supporter may, for example, include a first lamp support 212a for supporting the first ends of the lamps 210 and a second lamp support 212b for supporting the second ends of the lamps 210. In another aspect of the present invention, the first lamp support 212a may, for example, support the first external electrodes 203a of the plurality of lamps 210 and the second lamp support 212b may, for example, support the second external electrodes 203b of the plurality of lamps 210. In yet another aspect of the present invention, the fluorescent parts 205 of each lamp 210 may be disposed between the first and second lamp supports 212a and 212b. Accordingly, a gap between the first and second lamp supports 212a and 212b may correspond to a luminous area of the backlight unit and be aligned with a display region of an overlying LCD panel (not shown).

According to principles of the present invention, the fluorescent part 205 may be formed by coating a fluorescent material onto the interior surface of the tube. In one aspect of the present invention, the fluorescent part 205 of each lamp 210 may be longitudinally offset from the fluorescent part 205 of at least one adjacent lamp 210. In another aspect of the present invention, the fluorescent parts 205 of the plurality of lamps 210 may be alternately longitudinally offset. In yet another aspect of the present invention, fluorescent parts 205 of the plurality of lamps 210 may be longitudinally offset such that fluorescent parts 205 of odd-numbered the lamps 210 may, for example, be shifted longitudinally to the left (or right) with respect to the fluorescent parts 205 of even-numbered lamps 210. Additionally or alternatively, fluorescent parts 205 of even-numbered lamps 210 may, for example, be shifted longitudinally to the right (of left) with respect to fluorescent parts 205 of the odd-numbered lamps 210.

According to principles of the present invention, the first and second external electrodes 203a and 203b, respectively, may be formed as an opaque metal material provided at opposing ends of each lamp 210. In one aspect of the present invention, the external electrodes 203a and 203b may be formed by coating an opaque metal film onto the tube of each lamp 210. In another aspect of the present invention, the first and second external electrodes 203a and 203b of each lamp 210 may, for example, be connected to a voltage supply line and an inverter (both not shown) to construct a closed circuit around each lamp 210. In yet another aspect of the present invention, the length of the first and second external electrodes 203a and 203b may be substantially the same.

According to principles of the present invention, each lamp 210 may be longitudinally offset from at least one adjacent lamp 210. In one aspect of the present invention, the plurality of lamps 210 may be alternately longitudinally offset. In another aspect of the present invention, the plurality of lamps 210 may be longitudinally offset such that, for example, odd-numbered lamps 210 may be shifted longitudinally to the left (or right) within the first and second supporters 212a and 212b with respect to the even-numbered lamps 210. Additionally or alternatively, the even-numbered lamps 210 may be shifted longitudinally to the right (of left) within the first and second supporters 212a and 212b with respect to the odd-numbered lamps 210.

Figure 1:
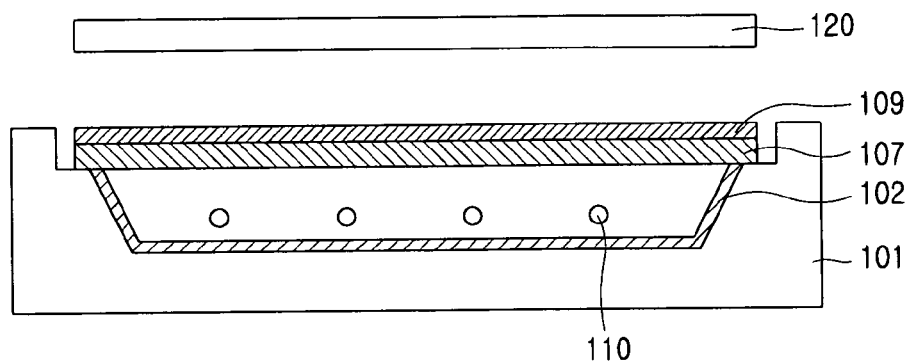
FIG. 1 illustrates a cross-sectional view of a related art direct-type backlight unit.
Figure 2:
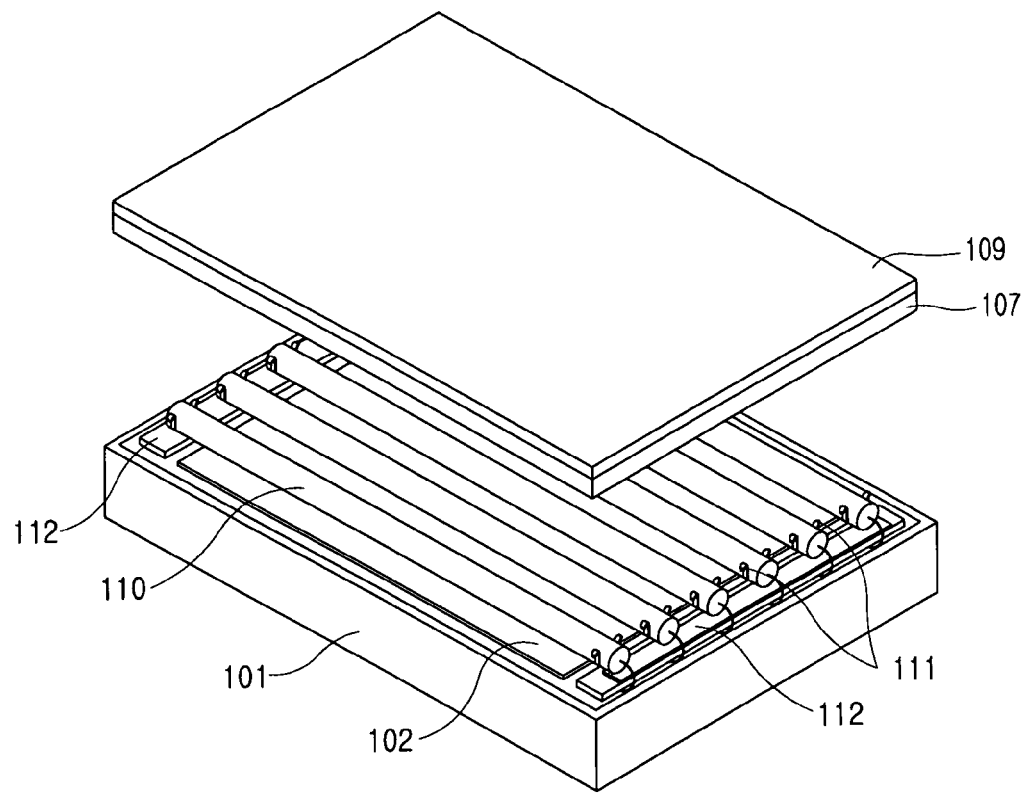
FIG. 2 illustrates a perspective view of the related art direct-type backlight unit shown in FIG. 1.
Figure 3:
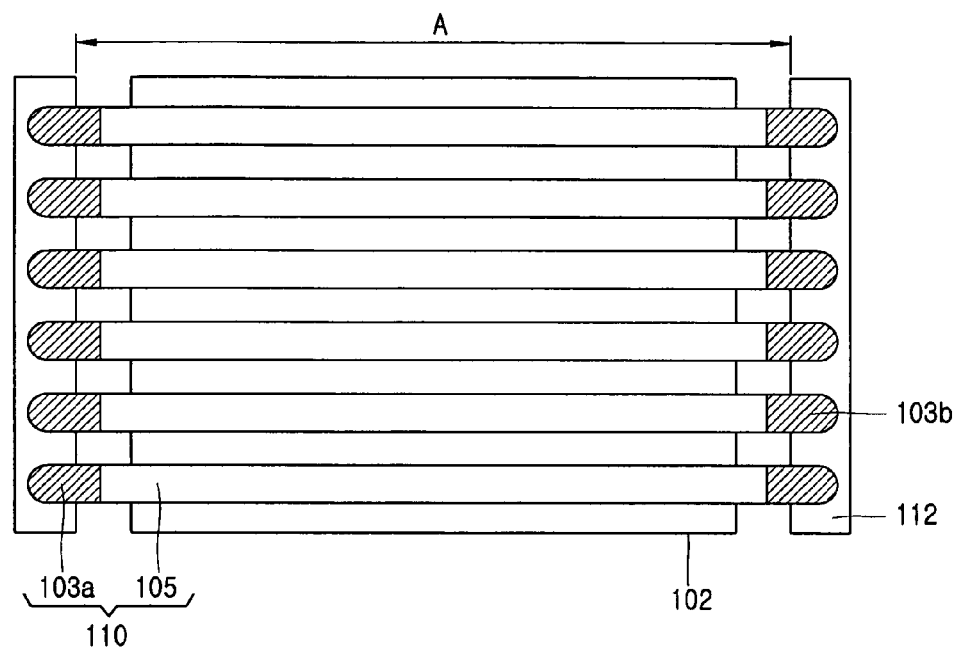
FIG. 3 illustrates a plan view of a related art direct-type backlight unit incorporating lamps with lengthened external electrodes.
Figure 4:
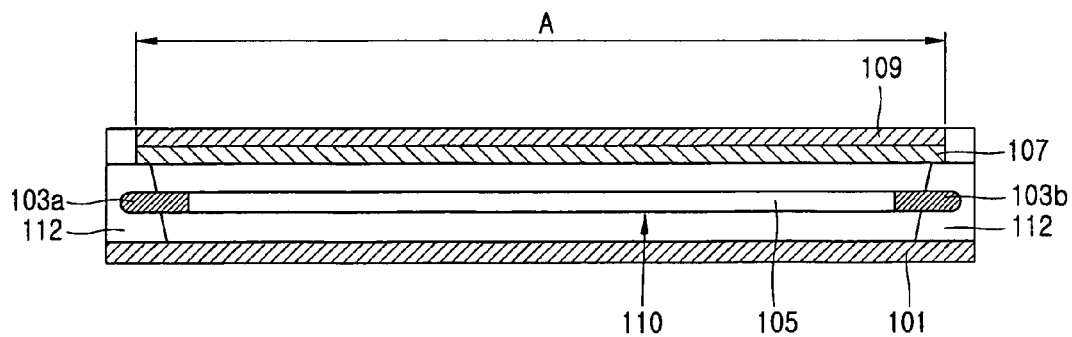
FIG. 4 illustrates a side view of the related art backlight unit shown in FIG. 3.

Constructed as described above, the first and second external electrodes 203a and 203b extend into the luminous area of the backlight unit shown in FIG. 5 in a non-uniform (e.g., staggered) manner, thereby providing a longitudinally offset arrangement of fluorescent parts 205. By longitudinally offsetting the luminescent parts 205, shadows may be prevented from being cast onto, for example, a diffusion plate aligned with a display region of an overlying LCD panel (not shown). Accordingly, the uniformity of light that the backlight unit shown in FIG. 5 transmits toward the display region of the LCD panel may be increased compared to the uniformity of light that the related art backlight unit shown, for example, in FIGS. 3 and 4 transmits toward the display region of the LCD panel. Moreover, an LCD device incorporating the backlight unit shown in FIG. 5 may express images at a higher average brightness than an LCD device incorporating the related art backlight unit shown, for example, in FIGS. 3 and 4.

Figure 6:
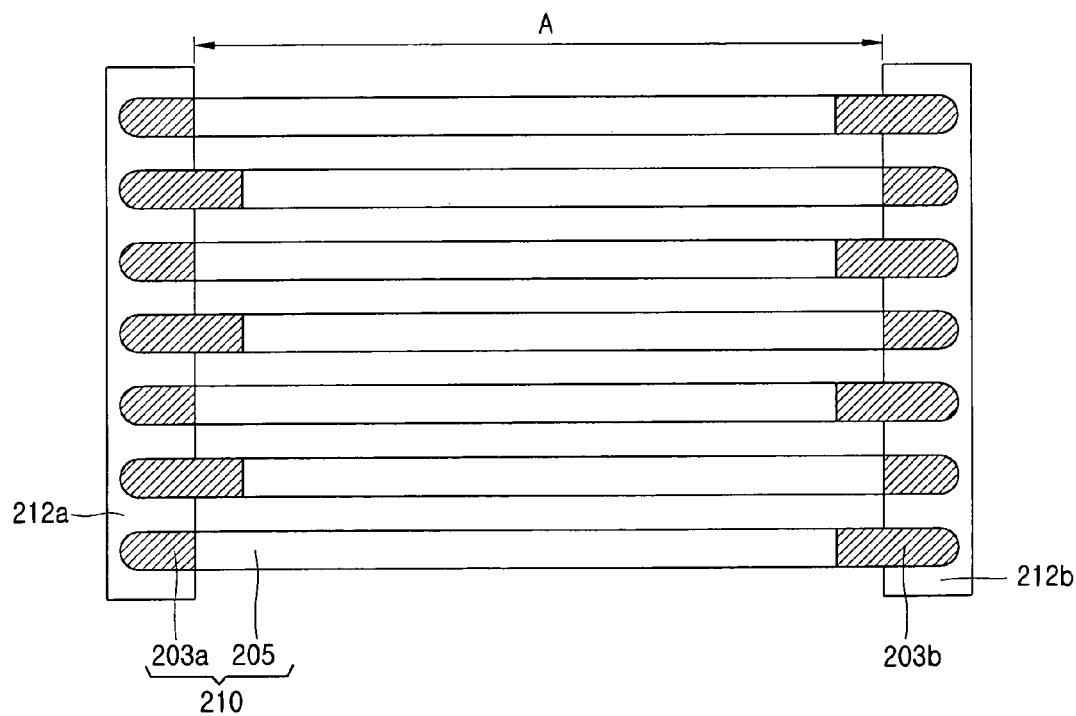
FIG. 6 illustrates a plan view of a direct-type backlight unit in accordance with the principles of a second embodiment of the present invention.

FIG. 6 illustrates a plan view of a direct-type backlight unit in accordance with the principles of a second embodiment of the present invention.

Referring to FIG. 6, the backlight unit according to principles of a second embodiment of the present may be similar to the backlight unit previously discussed with respect to FIG. 5 For example, the lamps 210 (each including first and second external electrodes 203a and 203b and fluorescent part 205) may be similarly supported by the first and second lamp supports 212a and 212b. Moreover, the fluorescent part 205 of each lamp 210 may be similarly longitudinally offset from the fluorescent part 205 of adjacent lamps 210. However, and in accordance with principles of the second embodiment, the plurality of lamps 210 may not be longitudinally offset from each other. For example, and as shown in FIG. 6, the plurality of lamps 210 may be substantially longitudinally aligned with adjacent ones of the lamps 210.

According to one aspect of the second embodiment, the lengths of the first and second external electrodes 203a and 203b, formed at respective first and second ends of each lamp 210, may not be the same. For example, a first external electrode 203a may be longer or shorter than a second external electrode 203b. Moreover, the first external electrodes 203a of adjacent lamps 210 may have different lengths. In another aspect of the present invention, the second external electrodes 203b of adjacent lamps 210 may have different lengths. For example, a first external electrode 203a of a first lamp 210 may be longer or shorter than a first external electrode 203a of a second lamp that is adjacent to the first lamp 210. Similarly, a second external electrode 203b of a first lamp 210 may be longer or shorter than a second external electrode 203b of a second lamp that is adjacent to the first lamp 210.

Constructed as described above, the first and second external electrodes extend into the luminous area of the backlight unit shown in FIG. 6 in a non-uniform (e.g., staggered) manner, thereby providing a longitudinally offset arrangement of fluorescent parts 205. By longitudinally offsetting the luminescent parts 205, shadows may be prevented from being cast onto, for example, a diffusion plate aligned with a display region of an overlying LCD panel (not shown). Accordingly, the uniformity of light that the backlight unit shown in FIG. 6 transmits toward the display region of the LCD panel may be increased compared to the uniformity of light that the related art backlight unit shown, for example, in FIGS. 3 and 4 transmits toward the display region of the LCD panel. Moreover, an LCD device incorporating the backlight unit shown in FIG. 6 may express images at a higher average brightness than an LCD device incorporating the related art backlight unit shown, for example, in FIGS. 3 and 4.

Figure 7:
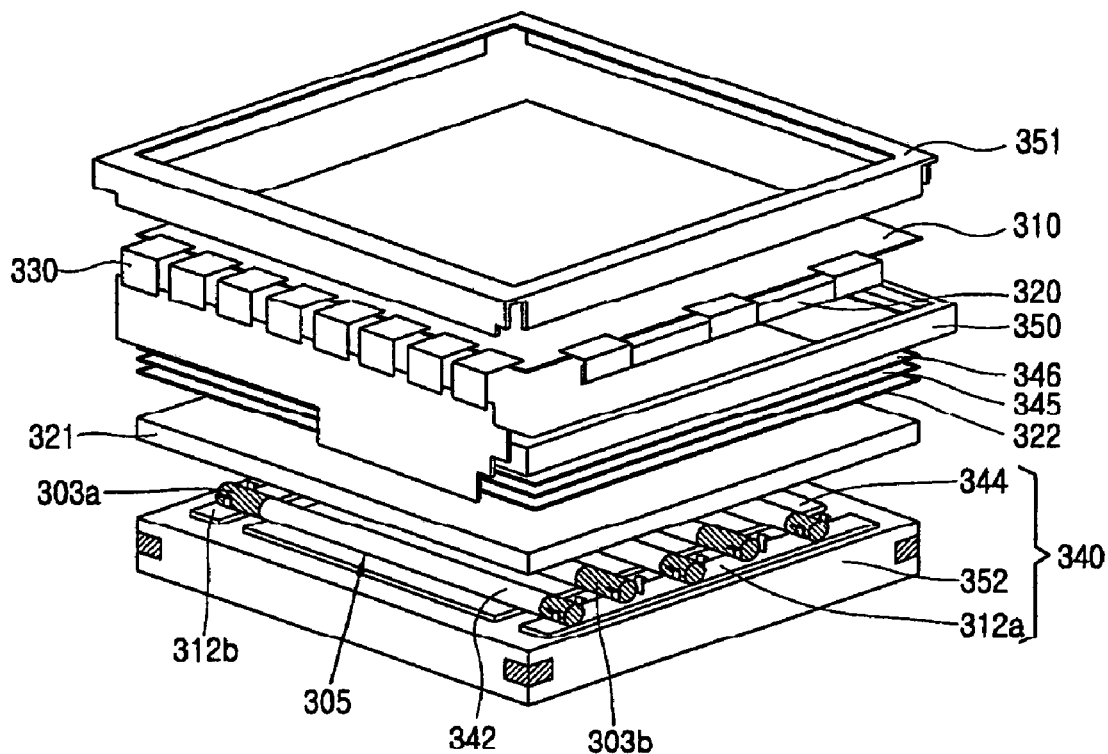
FIG. 7 illustrates an exploded perspective view of a liquid crystal display (LCD) device incorporating a direct-type backlight unit according to principles of the present invention.

FIG. 7 illustrates an exploded perspective view of a liquid crystal display (LCD) device incorporating a direct-type backlight unit according to principles of the present invention.

Referring to FIG. 7, a direct-type backlight unit may be incorporated within an LCD device. In one aspect of the present invention, the LCD device may, for example, include an LCD panel 310, a gate driver 320, and a data driver 330 connected to a side portion of the LCD panel 310, and a backlight unit 340 disposed beneath the LCD panel 310.

In one aspect of the present invention, the LCD panel 310 may, for example, include a TFT array substrate and a color filter substrate joined to the TFT array substrate to define a substantially uniform cell-gap, liquid crystal material within the cell-gap, and a plurality of pixels arranged in a matrix pattern. In another aspect of the present invention, the LCD panel may further include at least one common electrode and a plurality of pixel electrodes, wherein electric fields may be generated between the common and pixel electrodes to change light transmittance characteristics of the LCD panel. Specifically, when a voltage is applied to the at least one common electrode and when a voltage associated with a data signal is applied to a pixel electrode, an electric field may be generated between the common and pixel electrodes. Molecules within the liquid crystal material rotate in response to the generated electric field according to their dielectric anisotropy and, as a result of the rotation, the degree to which light emitted by the backlight unit is transmitted through the LCD panel 310 the liquid crystal transmits is controlled to display images. In yet another aspect of the present invention, the gate 320 and data drivers 330 may be coupled to the LCD panel 310 in any suitable manner to apply scanning and data signals, respectively, to gate lines and data lines (not shown) that are formed within the LCD panel 310. Accordingly, the scanning and data signals drive the plurality of pixels included within the LCD panel 310. In still another aspect of the present invention, switching devices (e.g., TFTs, etc.) may be provided within the pixels to selectively apply the data signals to the pixels electrodes in response to supplied scanning signals.

According to principles of the present invention, the backlight unit 340 may be provided as discussed above with respect to FIGS. 5 and 6. Accordingly, the backlight unit 340 may, for example, include a plurality of lamps 342 disposed beneath the rear surface of the LCD panel 310, a reflective plate 344 disposed beneath the plurality of lamps 342, and supports 312a and 312b for supporting the lamps 342 having the configurations exemplarily discussed with respect to FIGS. 5 and 6. In one aspect of the present invention, each lamp 342 may, for example, include a fluorescent part 305 and first and second external electrodes 303a and 303b having the configurations as discussed above with respect to FIGS. 5 or 6. In another aspect of the present invention, the backlight unit 340 may further include a diffusion plate 321 and a diffusion sheet 322 provided between the LCD panel 310 and the backlight unit 340.

According to principles of the present invention, light generated by the plurality of lamps 342 may be emitted toward the LCD panel 310 via the diffusion plate 321 and the diffusion sheet 322. In one aspect of the present invention, the diffusion plate 321 may be formed of a transparent material. In another aspect of the present invention, the diffusion sheet 322 may diffuse light incident upon the diffusion plate 321 and, therefore, further minimize the presence and intensity of shadows that are aligned with display regions of the LCD panel 310. In yet another aspect of the present invention, at least one prism sheet 345 may be disposed above the diffusion sheet 322 to condense light transmitted by the diffusion sheet 322 and uniformly distribute the condensed light to the entire rear surface of the LCD panel 310. In still another aspect of the present invention, a protection sheet 346 may be disposed on the at least one prism sheet 345 to protect the at least one prism sheet 345 from dust or scratches and to further diffuse light transmitted by the at least one prism sheet 345, thereby increasing the uniformity with which the condensed light is distributed to the rear surface of the LCD panel 310.

According to principles of the present invention, the LCD panel 310 and backlight unit 340 may, for example, be covered by a guide panel 350. In one aspect of the present invention, side surfaces of the covered LCD panel 310 and backlight unit 340 may be supported by a bottom cover 352 that is, in turn, coupled to the guide panel 350. In another aspect of the present invention, a front surface edge of the LCD panel 310 may be compressed by a front case 351, wherein the front case 351 may be coupled to the guide panel 350.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
   a plurality of lamps, including first, second and third lamps, wherein the second lamp is between the first and third lamps, wherein each lamp includes a first end corresponding to a first side of the backlight unit, a second end corresponding to a second side of the backlight unit, and a fluorescent part between the first and second ends, wherein adjacent ones of the plurality of lamps are longitudinally offset, wherein most of a length of each lamp is overlapped with adjacent lamps; and
   a first lamp support supporting first external electrodes at the first ends of the plurality of lamps and a second lamp support supporting second external electrodes at the second ends of the plurality of lamps, wherein the first end of each lamp overlaps the first lamp support and the second end of each lamp overlaps the second lamp support,
   wherein fluorescent parts of the adjacent lamps are longitudinally offset, wherein most of a length of each fluorescent part is overlapped with fluorescent parts of adjacent lamps, wherein fluorescent parts of the first and third lamps are longitudinally offset from a fluorescent part of the second lamp in the same direction,
   wherein more of each first external electrode at the first ends of the first and third lamps is overlapped with the first lamp support than each second external electrode at the second ends of the first and third lamps is overlapped with the second lamp support, and wherein more of the first external electrode at the first end of the second lamp is overlapped with the first lamp support than, the second external electrode at the second end of the second lamp adjacent to the first and third lamps is overlapped with the second lamp support.

2. The backlight unit of claim 1, wherein the plurality of lamps are substantially parallel.

3. The backlight unit of claim 1, wherein the fluorescent parts of the plurality of lamps are alternately longitudinally offset.

4. The backlight unit of claim 1, wherein the plurality of lamps are alternately longitudinally offset.

5. The backlight unit of claim 1 wherein the length of each first external electrode is substantially the same.

6. The backlight unit of claim 1, wherein the first external electrodes comprise different lengths.

7. The backlight unit of claim 6, wherein the lengths of adjacent first external electrodes are different.

8. The backlight unit of claim 7, wherein the lengths of adjacent first external electrodes alternate between first and second lengths.

9. The backlight unit of claim 1 wherein the length of each second external electrode is substantially the same.

10. The backlight unit of claim 1, wherein the second external electrodes comprise different lengths.

11. The backlight unit of claim 10, wherein the lengths of adjacent second external electrodes are different.

12. The backlight unit of claim 11, wherein the lengths of adjacent second external electrodes alternate between first and second lengths.

13. The backlight unit of claim 1, wherein the lengths of the first and second external electrodes for each lamp are substantially the same.

14. The backlight unit of claim 1, wherein the lengths of the first and second external electrodes for each lamp are different.

15. A liquid crystal display (LCD) device, comprising:
    an LCD panel; and
    a backlight unit beneath the LCD panel, wherein the backlight unit includes:
    a plurality of lamps, including first, second and third lamps, wherein the second lamp is between the first and third lamps, wherein each lamp includes a first end corresponding to a first side of the backlight unit, a second end corresponding to a second side of the backlight unit, and a fluorescent part between the first and second ends, wherein adjacent ones of the plurality of the lamps are longitudinally offset, wherein most of a length of each lamp is overlapped with adjacent lamps; and
    a first lamp support supporting first external electrodes at the first ends of the plurality of the lamps and a second lamp support supporting second external electrodes at the second ends of the plurality of the lamps, wherein the first end of each lamp overlaps the first lamp support and the second end of each lamp overlaps the second lamp support,
    wherein fluorescent parts of the adjacent lamps are longitudinally offset, wherein most of a length of each fluorescent part is overlapped with fluorescent parts of adjacent lamps, wherein fluorescent parts of the first and third lamps are longitudinally offset from a fluorescent part of the second lamp in the same direction,
    wherein more of each first external electrode at the first ends of the first and third lamps is overlapped with the first lamp support than each second external electrode at the second ends of the first and third lamps is overlapped with the second lamp support, and wherein more of the first external electrode at the first end of the second lamp is overlapped with the first lamp support than, the second external electrode at the second end of the second lamp adjacent to the first and third lamps is overlapped with the second lamp support.

16. The LCD device of claim 15, further comprising:
    a reflective plate beneath the plurality of lamps; and a diffusion plate between the LCD panel and the plurality of lamps.

17. The LCD device of claim 15, wherein the plurality of lamps are substantially parallel to each other.

18. The LCD device of claim 15, wherein the fluorescent parts of the plurality of lamps are alternately longitudinally offset.

19. The LCD device of claim 15, wherein adjacent ones of the plurality of lamps are alternately longitudinally offset.

20. The LCD device of claim 15, wherein the length of each first external electrode is substantially the same.

21. The LCD device of claim 15, wherein the first external electrodes comprise different lengths.

22. The LCD device of claim 21, wherein the lengths of adjacent first external electrodes are different.

23. The LCD device of claim 22, wherein the lengths of adjacent first external electrodes alternate between first and second lengths.

24. The LCD device of claim 15, wherein the length of each second external electrode is substantially the same.

25. The LCD device of claim 15, wherein the second external electrodes comprise different lengths.

26. The LCD device of claim 25, wherein the lengths of adjacent second external electrodes are different.

27. The LCD device of claim 26, wherein the lengths of adjacent second external electrodes alternate between first and second lengths.

28. The LCD device of claim 15, wherein the lengths of the first and second external electrodes for each lamp are substantially the same.

29. The LCD device of claim 15, wherein the lengths of the first and second external electrodes for each lamp are different.

* * * * *